US007349191B2

(12) United States Patent
Harwath

(10) Patent No.: US 7,349,191 B2
(45) Date of Patent: Mar. 25, 2008

(54) OFFSET PLANAR COIL COAXIAL SURGE SUPPRESSOR

(75) Inventor: Frank Harwath, Naperville, IL (US)

(73) Assignee: Andrew Corporation, Westchester, IL (US)

( * ) Notice: Subject to any disclaimer, the term of this patent is extended or adjusted under 35 U.S.C. 154(b) by 238 days.

(21) Appl. No.: 11/162,217

(22) Filed: Sep. 1, 2005

(65) Prior Publication Data

US 2007/0053130 A1 Mar. 8, 2007

(51) Int. Cl.
*H02H 1/00* (2006.01)

(52) U.S. Cl. ...................................................... 361/117

(58) Field of Classification Search ................ 361/117, 361/119; 333/81 A, 167, 222–226, 206
See application file for complete search history.

(56) References Cited

U.S. PATENT DOCUMENTS 3,289,117 A 11/1966 Kearns et al.
4,236,188 A 11/1980 Prochazka
4,409,637 A 10/1983 Block
4,525,690 A 6/1985 De Ronde
4,584,624 A 4/1986 Hines
4,701,825 A 10/1987 Pagliuca
5,053,910 A 10/1991 Goldstein
5,745,328 A 4/1998 Bellantoni
5,764,114 A * 6/1998 Kuhne ......................... 333/12
5,978,199 A * 11/1999 Germann et al. ........... 361/119
5,982,602 A 11/1999 Tellas et al.
6,061,223 A 5/2000 Jones et al.
6,101,080 A 8/2000 Kuhne
6,236,551 B1 5/2001 Jones et al.
6,452,773 B1 9/2002 Aleksa et al.
6,636,408 B2 10/2003 Pagliuca
6,688,916 B1 2/2004 Lee
6,721,155 B2 4/2004 Ryman
6,785,110 B2 8/2004 Bartel et al.
2004/0100751 A1 5/2004 Ammann
2004/0169986 A1 9/2004 Kauffman

* cited by examiner

*Primary Examiner*—Michael Sherry
*Assistant Examiner*—Nicholas Ieva
(74) *Attorney, Agent, or Firm*—Babcock IP, PLLC

(57) ABSTRACT

An in-line surge suppressor assembly having a body with a side aperture and an inner conductor positioned coaxial within a bore of the body. An insert having a planar inductor coil with a post extending from an origin point of the planar inductor coil is positioned with the post passing through the side aperture and coupled to the inner conductor at a distal end. An outer rim of the planar inductor coil is electrically coupled to the body.

20 Claims, 5 Drawing Sheets

OFFSET PLANAR COIL COAXIAL SURGE SUPPRESSOR

BACKGROUND

1. Field of the Invention

The invention generally relates to surge protection of coaxial cables and transmission lines. More particularly, the invention relates to a planar coil surge suppressor insert and related compact surge protector housing for use in-line with a coaxial cable or transmission line, configurable for a range of different frequency bands.

2. Description of Related Art

Electrical cables, for example coaxial transmission lines of antenna towers, are equipped with surge suppression equipment to provide an electrical path to ground for diversion of electrical current surges resulting from, for example, static discharge and or lightning strikes.

Prior coaxial suppression equipment typically incorporated a frequency selective shorting element between the inner and outer conductors dimensioned to be approximately one quarter of the frequency band center frequency in length, known as a quarter wavelength stub. Therefore, frequencies within the operating band pass along the inner conductor reflecting in phase from the quarter wavelength stub back to the inner conductor rather than being diverted to the outer conductor and or a grounding connection. Frequencies outside of the operating band, such as low frequency surges from lightning strikes, do not reflect and are coupled to ground, preventing electrical damage to downstream components and or equipment.

Depending upon the desired frequency band, a shorting element dimensioned as a quarter wavelength stub may have a required dimension of several inches, requiring a substantial supporting enclosure. Prior quarter wavelength stub surge suppressors, such as described in U.S. Pat. No. 5,982,602 "Surge Protector Connector" by Tellas et al, issued Nov. 9, 1999 commonly owned with the present application by Andrew Corporation and hereby incorporated by reference in the entirety, reduce the required enclosure size by spiraling the stub within the enclosure, forming a planar coil normal to the inner conductor.

To avoid undesired parasitic capacitance and or resonant effects between the initial coil winding and the inner conductor, the coil is loosely wound to increase the spacing between the coil and the inner conductor. To enclose the planar coil, the required enclosure is relatively large and expensive. The increased overall diameter of the required enclosure spaces interconnection cables away from cable runs, because the inner conductor minimum distance from a mounting plane such as a wall is increased as the enclosure diameter increases. Also, because the planar coil is normal to and wound about the inner conductor, the assembly must be removed from connecting cables and or equipment to enable disassembly of the surge suppressor for inspection and or exchange of the planar coil.

As the spiral aspect of the shorting element increases, an inductance arises. The high frequency magnetic field effects of an inductor structure having an affect on the impedance of the frequency selective shorting element that allows the overall length of the shorting element to be reduced, compared to a straight or loosely spiraled quarter wavelength stub. U.S. Pat. No. 6,452,773 "Broadband Shorted Stub Surge Protector" by Aleksa et al, issued Sep. 17, 2002 commonly owned with the present application by Andrew Corporation and hereby incorporated by reference in the entirety applies a stub portion and an inductor portion formed as a helical rather than planar coil. Although the combination of a stub portion and an inductor portion widens the operating frequency band of the device, different frequency band specific shorting element configurations may still be required to satisfy specific frequency bands. The helical coil inductor portion may be accessed with minimal disassembly, but requires precision machining operations during manufacture and a corresponding elongated enclosure cavity.

Competition within the electrical cable and associated accessory industries has focused attention on cost reductions resulting from increased manufacturing efficiencies, reduced installation requirements and simplification/overall number of discrete parts reduction.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

A first exemplary embodiment of the invention is described with reference to FIGS. 1-5.

Figure 7:
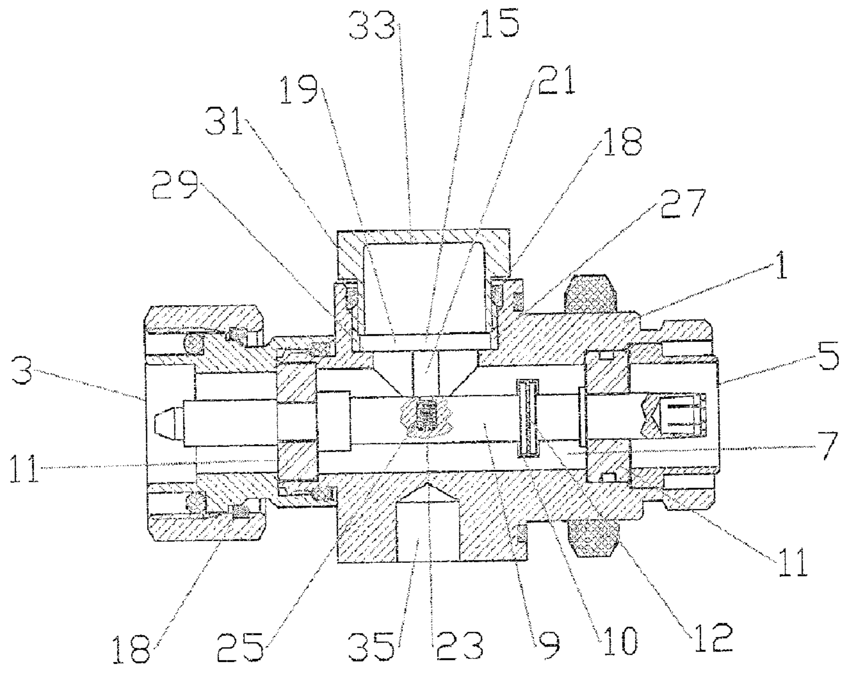
FIG. 7 is a cut-away side schematic view (partial cut-away of center conductor) of another embodiment of the invention.

The surge suppressor body 1 may be formed as an in-line assembly dimensioned for a desired co-axial cable or transmission line with a first connection end 3 and a second connection end 5 adapted to couple with a cable outer conductor of a co-axial cable or other equipment at either end via connection interface(s). Although the embodiments herein are demonstrated with 7-16 DIN connection interface(s), one skilled in the art will recognize that any desired standardized or proprietary connection interface may be applied. The body 1 has a bore 7 in which an inner conductor 9 is positioned, also extending between the first connection end 3 and the second connection end 5 to similarly couple with a cable inner conductor or other equipment. The inner conductor 9 may be positioned coaxial within the bore 7 and isolated from the body 1 by one or more insulator(s) 11. The inner conductor 9 may be contiguous between the first connection end 3 and the second connection end 5 or, as shown for example in FIG. 7, include a capacitively coupled direct current break 10, for example separated by a dielectric spacer 12, to allow application of direct current power and or control signals upstream of the surge suppressor.

An insert mount 13, adapted to couple a surge suppression insert 15 between the inner conductor 9 and the outer conductor, i.e. the body 1, extends from a side aperture 17 of the body 1, located between the first connection end 3 and the second connection end 5. For ease of manufacturing, the insert mount 13 may be formed separately from the body 1 and then coupled to the body 1 for example via threads, conductive adhesive, welding or an interference fit. A gasket 18, such as an o-ring may be applied to environmentally seal threaded connections.

Figure 1:
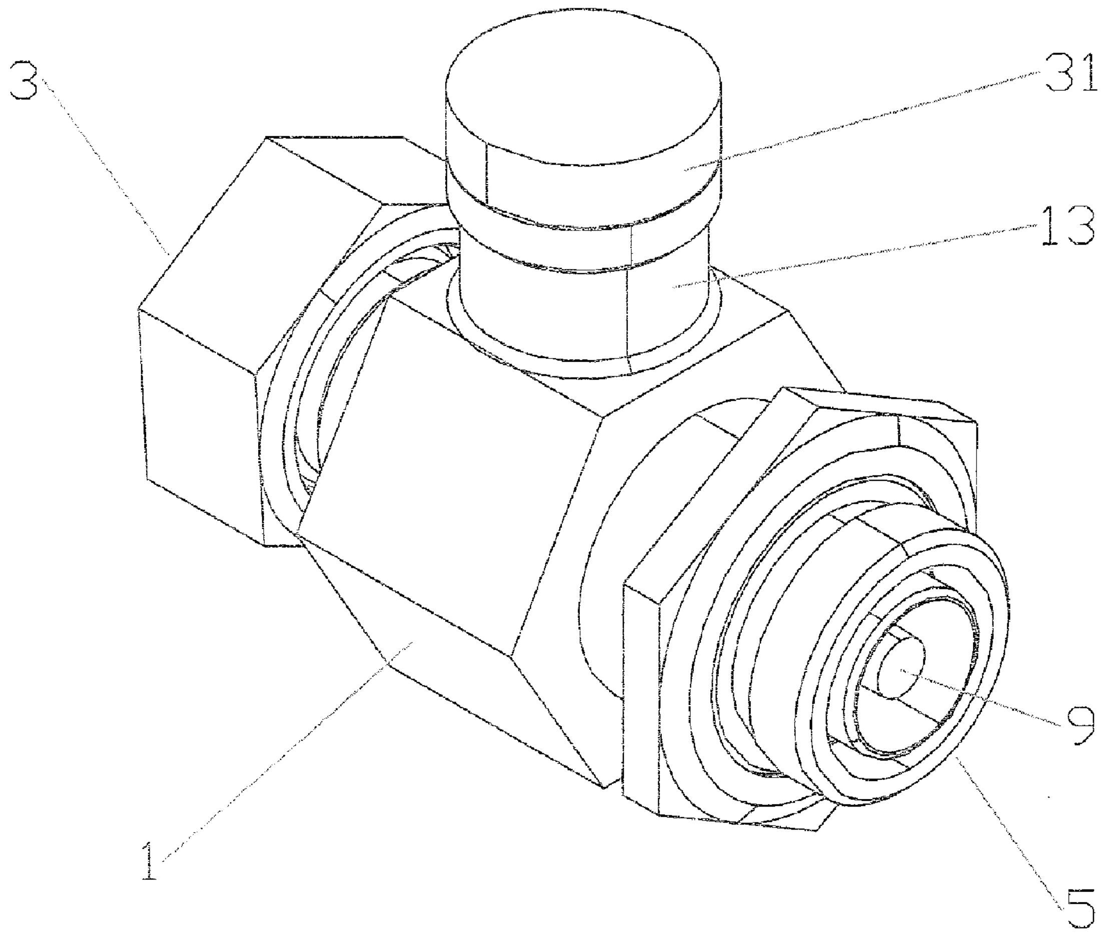
FIG. 1 is an isometric external schematic view of a first exemplary embodiment of the invention.
Figure 2:
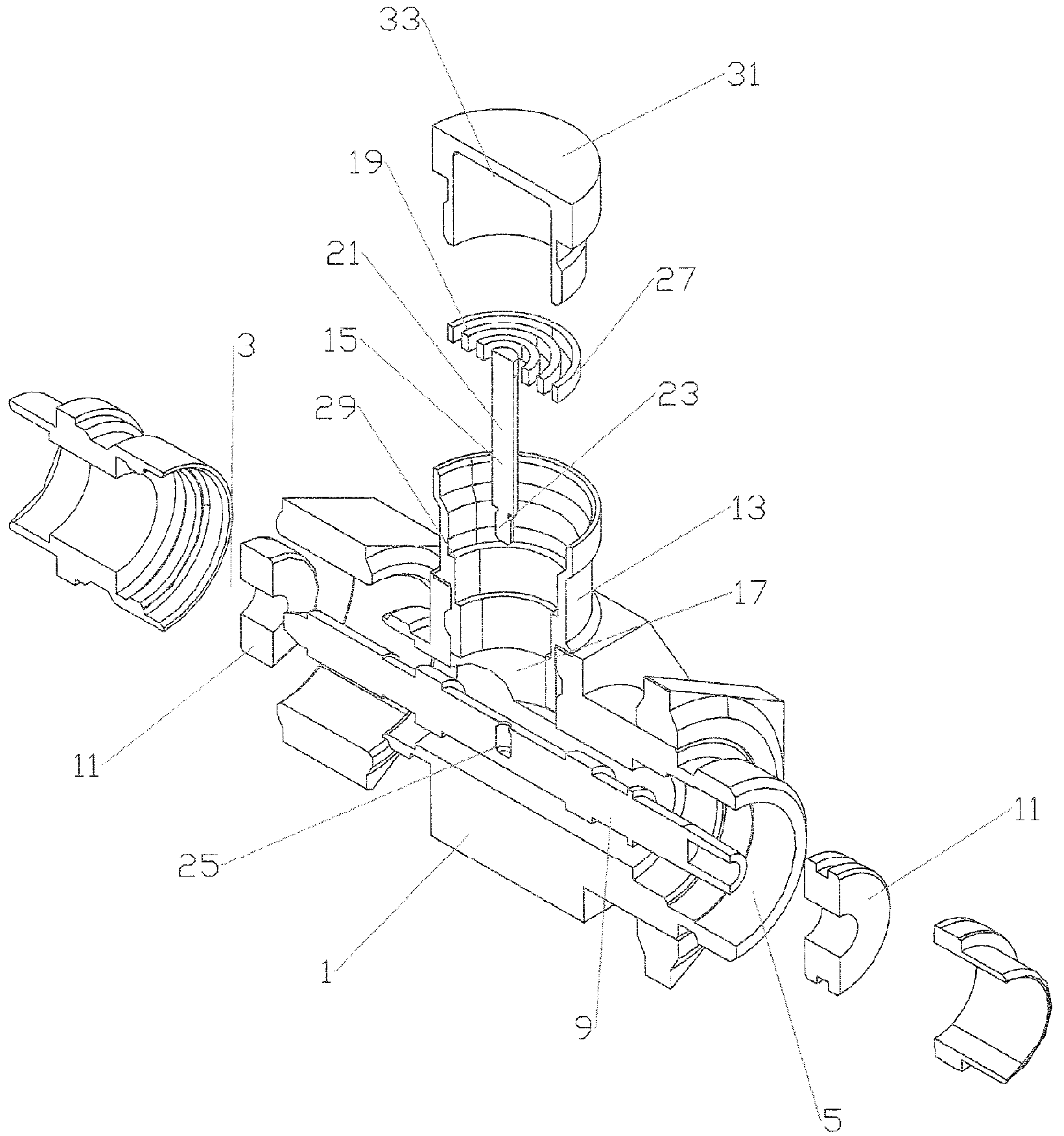
FIG. 2 is an isometric exploded cross-section view of FIG. 1.
Figure 3:
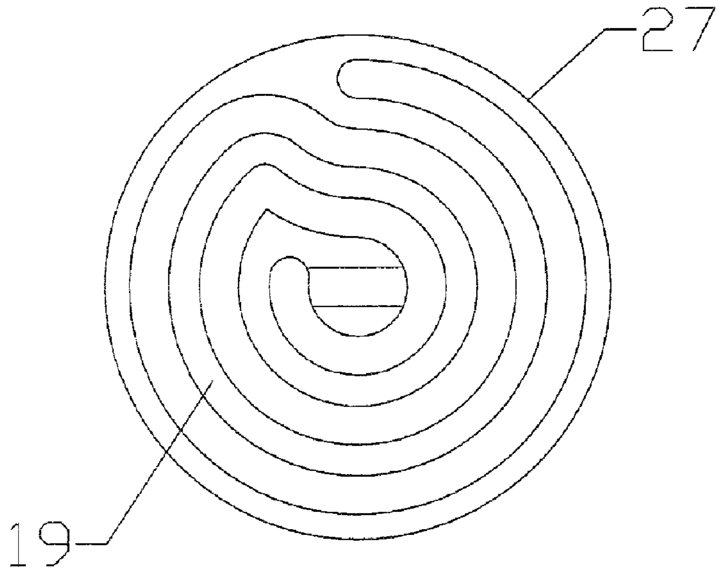
FIG. 3 is a schematic end view of the surge suppressor insert.
Figure 4:
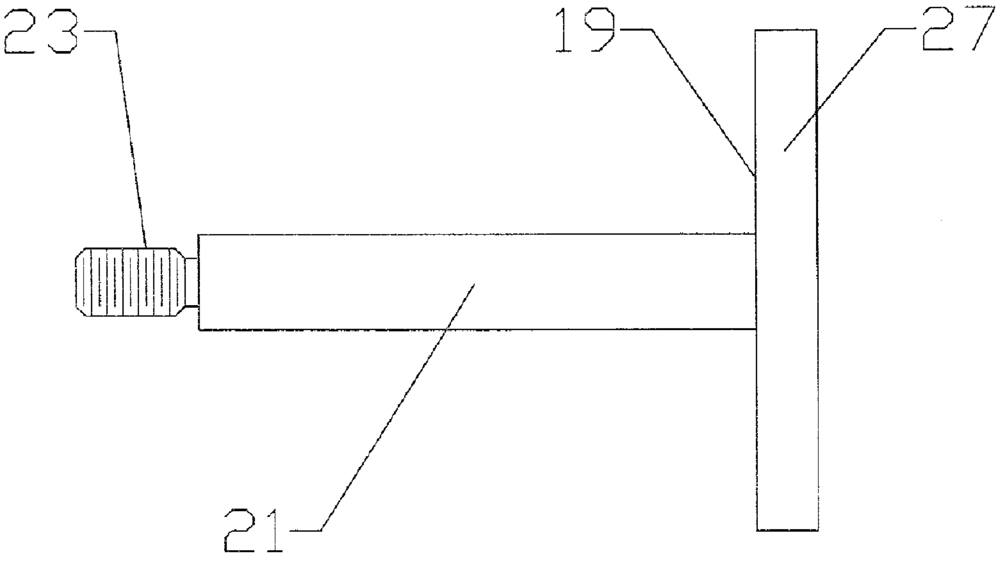
FIG. 4 is a schematic side view of the surge suppressor insert.
Figure 5:
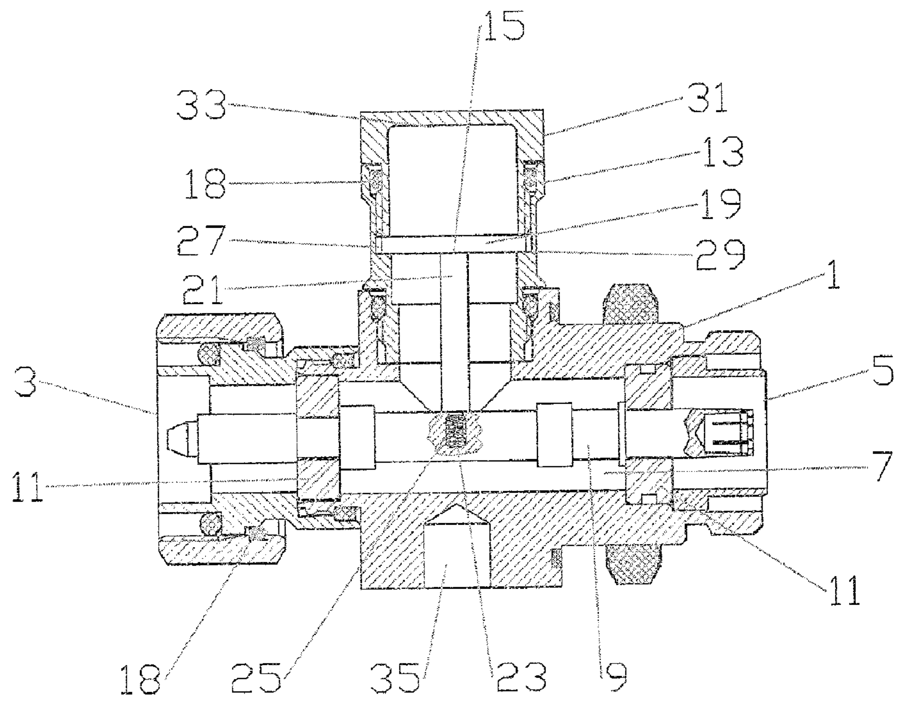
FIG. 5 is a cut-away side schematic view (partial cut-away of center conductor) of FIG. 1.

As best shown in FIGS. 3 and 4, the insert 15 is formed as a planar inductor coil 19 with a post 21 that couples the origin point of the planar inductor coil 19 to the inner conductor 9, for example via a threaded end portion 23 at a distal end adapted to thread into a corresponding threaded hole 25 of the inner conductor 9. Alternatively, the post 23 may be coupled to the inner conductor 9 via conductive adhesive, welding or an interference fit. A "planar inductor coil" is defined as a coil in which successive rotations spiraling outward from the origin point of the coil are formed substantially within a common plane. Although demonstrated in a circular configuration with the origin point proximate the center, the coil may formed in alternative configurations such as, serpentine, rectangular or non-symetric with a central or offset origin point. Further, although the invention is demonstrated herein with a single spiral arm, multiple spiral arms formed spiraling outward from the origin point to the coil periphery in a common plane are also considered a "planar inductor coil" according to the invention.

An outer rim 27 of the planar inductor coil 19 is electrically coupled to the body 1, for example, via an inner annular shoulder 29 of the surge suppressor insert mount 13. Although demonstrated with a continuous outer rim 27 which surrounds the planar inductor coil 19, the outer rim 27 may alternatively be only a short termination area at the distal end of the spiral arm. An end cap 31, for example threaded into the distal end of the surge suppressor insert mount 13, clamps the outer rim 27 against the inner annular shoulder 29.

The planar inductor coil 19 and post 21 may be cost effectively formed as an integral casting or as a separate planar inductor coil 19 and post 21 that are then coupled together, for example by a rivet, interference fit or threads. If the planar inductor coil 19 is formed separate from the post 21, the planar inductor coil 19 may be stamped from a single or multiple thin sheets that are stacked together to provide the planar inductor coil 19 with a cross section selected for a desired surge current capacity.

Figure 6:
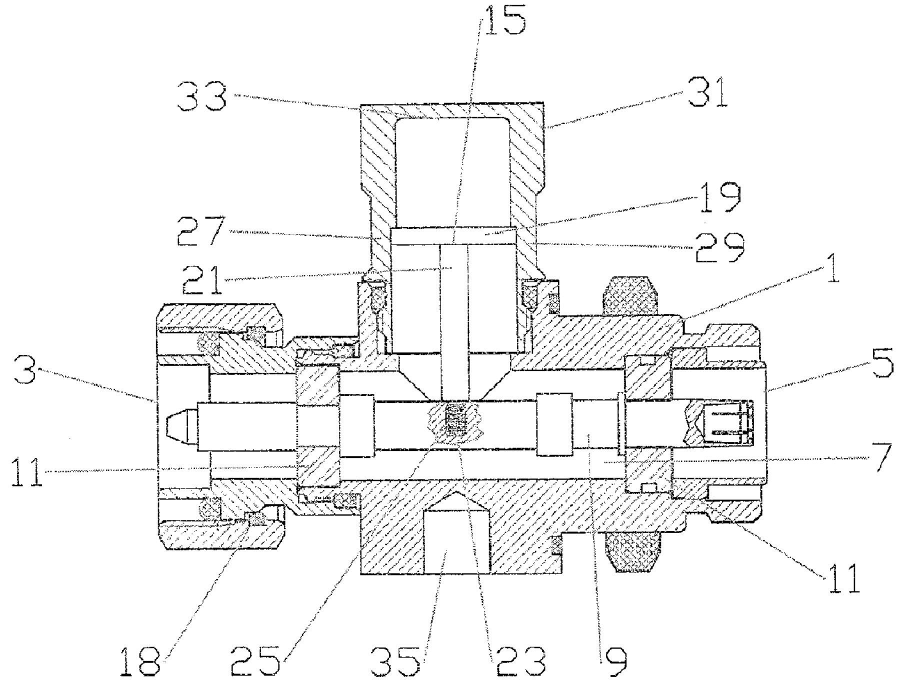
FIG. 6 is a cut-away side schematic view (partial cut-away of center conductor) of another embodiment of the invention.

The electrical coupling of the outer rim 27 to the body 1 is not limited to use of an insert mount 13. In further embodiments, for example as shown in FIG. 6, the electrical insert mount 13 may be omitted and the end cap 31 formed with the inner annular shoulder 29 oriented to engage the outer rim 27 of the planar inductor coil 19 as the end cap 31 is threaded into the body 1. Alternatively, the surge suppression insert 15 may be permanently coupled to the end cap 31 by interference fit, welding, conductive adhesive or the like so that the threaded end portion 23 of the post 21 threads into the threaded hole 25 as the end cap 31 is threaded into the body 1.

Figure 8:
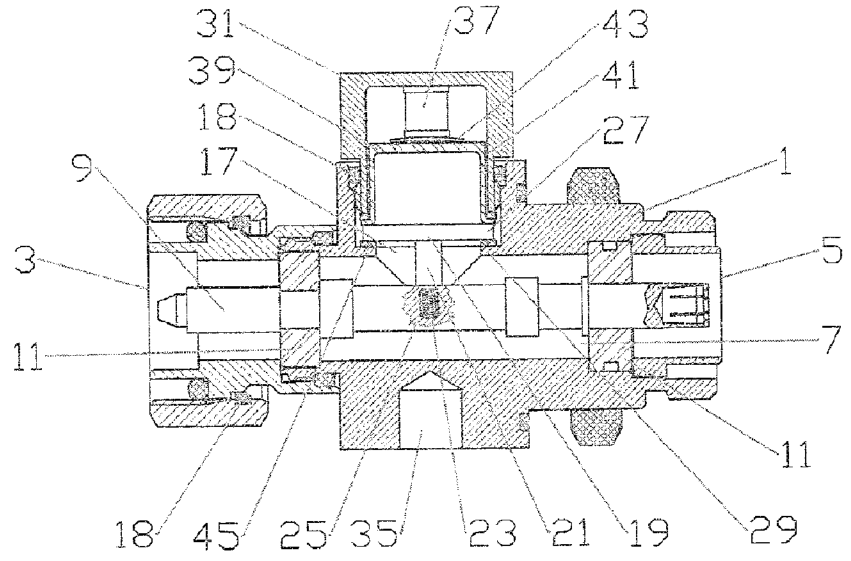
FIG. 8 is a cut-away side schematic view (partial cut-away of center conductor) of another embodiment of the invention.

The post 21, insert mount 13 and end cap 31 may be dimensioned so that surfaces parallel to the plane of the planar inductor coil 19 are spaced away from the planar inductor coil 19 to minimize generation of parasitic capacitance. Preferably, the planar inductor coil 19 is positioned at least as far from the inner surface 33 of the end cap 31 as it is from the inner conductor 9. As shown for example in FIGS. 7 and 8, in high frequency configurations, the distances between the planar inductor coil 19, inner conductor 9 and inside surface 33 of the end cap 31 may be reduced, reducing the overall size of the assembly. In these embodiments, the inner annular shoulder 29 against which the outer rim 27 of the planar inductor coil 19 is seated may be formed, for example, in the body 1, proximate the side aperture 17.

Gas discharge tubes have the electrical characteristics of an open circuit until a breakdown voltage differential across the tube is applied, ionizing gas enclosed within the tube and closing the circuit. As shown for example in FIG. 8, a further embodiment of the invention may include a gas discharge tube 37 applied in a series connection with the planar inductor coil 19. The gas discharge tube completes an electrical circuit between the inner conductor 9 and body 1 (outer conductor), through the planar inductor coil 19, only when a surge in excess of the selected gas discharge tube ionization voltage occurs. Gas discharge tubes are known to those skilled in the surge suppression art and therefore are not described in further detail herein.

The gas discharge tube 37 may be positioned, for example, between the inner surface 33 of the end cap 31 and an inner cap 39 in contact with the outer rim 27 of the planar inductor coil 19. The inner cap 39 is electrically isolated from the end cap 31 by an insulating sleeve 41 and or an insulating spacer 45. A spring 43 may be applied, for example, between the inner cap 39 and the gas discharge tube 37 maintains a secure electrical connection and limits compression force upon the gas discharge tube 37 during threading of the end cap 31. Alternatively, a screw applied projecting through the end cap 31 may be adjusted to adjust bias upon the gas discharge tube 37 between the inner cap 39 and the end cap 31. The inner cap 39 provides the desired planar surface spacing from the top of the planar inductor coil 19. The planar inductor coil 19 is electrically isolated from the inner annular shoulder 29, here formed in the body 1, by an insulating spacer 45.

The present inventors have recognized that positioning the plane of the planar coil parallel to the longitudinal axis of the inner conductor has significant advantages. Because the post 21 positions the planar inductor coil 19 at a distance from the inner conductor 9 and outside of the inner diameter of the outer conductor (body), the inductive and or parasitic capacitance interaction with the inner conductor is minimized, allowing the planar inductor coil 19 to be wound much more compactly and enclosed in a significantly smaller enclosure without sacrificing peak current capacity. Further, the impedance discontinuity introduced by the presence of the prior enclosing cavity and or side aperture leading to the enclosing cavity may be reduced because the post has a smaller cross section than the prior coiled strip, reducing the size requirements of the side aperture 17. Because the T-shape of the body and surge suppressor mount does not have a significantly increased dimension with respect to the diameter of interconnecting cables along the back side, mounting and or grounding, for example via a threaded connection point 35, of the surge suppressor assembly in-line with a cable and or alongside other cables in close quarters is simplified.

One skilled in the art will appreciate that the present invention represents a significant improvement in size requirements, ease of use, manufacturing and cost efficiency.

The overall materials requirements, machining operations and total number of discrete components are reduced. The readily exchangeable surge suppression inserts and insert mounts according to the invention may be cost effectively manufactured for a range of different frequency bands. Surge suppressor assemblies according to the invention for specific frequency bands may be quickly assembled using an increased number of standardized sub components for on-demand delivery with minimal lead time, eliminating the need for large stocks of pre-assembled frequency band specific surge suppressor inventory. Should a surge suppressor be damaged, or the desired frequency band of operation change, the surge suppression insert may be easily exchanged by the user without disturbing interconnections with surrounding equipment.

| Table of Parts | |
|---|---|
| 1 | body |
| 3 | first connection end |
| 5 | second connection end |
| 7 | bore |
| 9 | inner conductor |
| 10 | break |
| 11 | insulator |
| 12 | spacer |
| 13 | insert mount |
| 15 | insert |
| 17 | side aperture |
| 18 | gasket |
| 19 | planar inductor coil |
| 21 | post |
| 23 | threaded end portion |
| 25 | threaded hole |
| 27 | outer rim |
| 29 | inner annular shoulder |
| 31 | end cap |
| 33 | inner surface |
| 35 | connection point |
| 37 | gas discharge tube |
| 39 | inner cap |
| 41 | insulating sleeve |
| 43 | spring |
| 45 | insulating spacer |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. An in-line surge suppressor assembly, comprising:

a body; an inner conductor positioned within a bore of the body; an insert mount at a side aperture of the body having an inner annular shoulder;

an insert having a planar inductor coil with an outer rim and a post extending from an origin point of the planar inductor coil; the planar inductor coil positioned outside of the bore;

the outer rim clamped against the inner annular shoulder by an end cap; and a distal end of the post coupled to the inner conductor.

2. The assembly of claim 1, wherein a plane of the planar inductor coil is parallel to a longitudinal axis of the inner conductor.

3. The assembly of claim 1, wherein the planar inductor coil is positioned at least as far from an inner surface of the end cap as it is from the inner conductor.

4. An in-line surge suppressor assembly, comprising: a body having a side aperture and a bore; an inner conductor positioned coaxial within the bore; an end cap having an inner annular shoulder, the end cap threadable into the side aperture; an insert having a planar inductor coil with an outer rim and a post extending from an origin point of the planar inductor coil; the outer rim clamped between the inner annular shoulder and the body; the planar inductor coil positioned outside of the bore; a distal end of the post coupled to the inner conductor.

5. The assembly of claim 4, wherein a plane of the planar inductor coil is parallel to a longitudinal axis of the inner conductor.

6. The assembly of claim 4, wherein the outer rim is rigidly coupled to the inner annular shoulder; the distal end of the post threading into a threaded hole in the inner conductor as the end cap is threaded into the body.

7. An in-line surge suppressor assembly, comprising: a body with a side aperture; an inner conductor positioned coaxial within a bore of the body; a surge suppressor insert having a planar inductor coil with a post extending from an origin point of the planar inductor coil; the planar inductor coil positioned outside of the bore; the post passing through the side aperture and coupled to the inner conductor at a distal end; the body electrically coupled to the inner conductor through an outer rim of the planar inductor coil.

8. The assembly of claim 7, wherein a plane of the planar inductor coil is parallel to a longitudinal axis of the inner conductor.

9. The assembly of claim 7, wherein the distal end threads into a threaded hole in the inner conductor.

10. The assembly of claim 7, wherein the planar inductor coil and the post are an integral component.

11. The assembly of claim 7, wherein the planar inductor coil is a plurality of individual planar inductor coils stacked together to create a desired cross sectional area.

12. The assembly of claim 7, further including a break in the inner conductor.

13. The assembly of claim 12, wherein the break is a dielectric spacer inserted inline with the inner conductor.

14. The assembly of claim 7, wherein the outer rim of the planar inductor coil is coupled to the body via a clamp connection between an inner annular shoulder and an end cap.

15. The assembly of claim 14, wherein the inner annular shoulder is formed in an insert mount coupled to the body at the side aperture.

16. The assembly of claim 14, wherein the inner annular shoulder is formed in an end cap coupled to the body at the side aperture.

17. The assembly of claim 14, wherein the inner annular shoulder is formed in the body at the side aperture.

18. The assembly of claim 7, further including a gas discharge tube electrically connected between the outer rim and the endcap.

19. The assembly of claim 18, further including an end cap and an inner cap; the inner cap seated upon the outer rim and electrically insulated from the body; the gas discharge tube electrically coupled between the inner cap and the endcap; the end cap coupled to the body enclosing the inner cap and the gas discharge tube.

20. The assembly of claim 18, further including a spring biased against the gas discharge tube.

* * * * *